Patented June 20, 1950

2,511,915

UNITED STATES PATENT OFFICE 2,511,915

PRODUCTION OF CHLORONITRO COMPOUNDS

Chester M. Himel, Bartlesville, Okla., assignor to Phillips Petroleum Company, a corporation of Delaware No Drawing. Application December 18, 1946,
Serial No. 717,081

14 Claims. (Cl. 260—644)

This invention relates to the addition of nitryl chloride to compounds containing an olefinic linkage. More specifically this invention is concerned with the reaction between nitryl chloride and unsaturated aliphatic hydrocarbons containing an olefinic linkage, such unsaturated compounds containing at least three carbon atoms to produce chloronitro compounds which have widespread uses as organic intermediates, solvents, plasticizers, insecticides, insect repellents, rubber additives, oil additives, etc.

I have found that compounds of the chloronitro type possess a wide variation in properties, depending upon the organic starting materials employed, and that these compounds have numerous uses in many fields. By virtue of the reactivity of both the chloro and nitro groups, these compounds are particularly suitable as organic intermediates and their use in the manufacture of many important materials such as surface active agents, resinous materials and other products represents a definite advance in the art of synthetic chemistry. In addition to their value as organic intermediates, these compounds may be used directly as solvents, plasticizers, insecticides and the like as hereinbefore mentioned.

It is, therefore, an object of the present invention to describe a process for the manufacture of nitryl chloride addition products with unsaturated aliphatic hydrocarbons having at least three carbon atoms. It is a further object of the invention to describe a process for the preparation of chloronitro paraffins having at least three carbon atoms and to further describe novel compounds prepared by such a process. Further objects will be apparent from the disclosure herein.

I have found that nitryl chloride will react readily with an olefinic linkage in unsaturated aliphatic hydrocarbons having three or more carbon atoms in the chain to produce the chloronitro compounds of this invention. I have also found that in any reaction involving the addition of nitryl chloride to the olefinic linkage, the reaction may result in the formation of three different types of products as follows: the nitryl chloride may serve as chlorinating agent to yield a dichloro derivative as the chief product; the nitryl chloride may undergo decomposition to produce nitrogen tetroxide which, in turn, undergoes reaction with the double bond to yield a compound having —ONO and —NO$_2$ groups, respectively, on adjacent carbon atoms; the reaction may proceed in the direction which gives a chloronitro compound, in which the chlorine and nitro groups respectively are attached to adjacent carbon atoms. I have found further that the reaction conditions have a marked effect on both the quantity and the type of products formed. The mixture of products resulting from the addition of nitryl chloride to these olefinic compounds may be termed nitryl chloride adducts. Where the compound contains a plurality of olefinic linkages, a certain amount of other compounds may be formed due to addition in other positions. For example, with butadiene-1, 3; 1-4 addition as well as addition of a second mol of NO$_2$Cl to the 2- and 3-carbon atoms will occur to some extent.

In general, the three types of products mentioned above appear in varying proportions when nitryl chloride reacts with monoolefins and diolefins. However, the temperature at which the reaction is effected, together with other factors such as variations in pressure and the presence or absence of a diluent, determine which product or products will predominate. Therefore, in any given reaction system, it is possible to determine optimum conditions for the production of the desired material. For example, I have observed that in general a certain temperature level promotes the formation of the chloronitro compound almost to the exclusion of other products while relatively large amounts of the dichloro derivative may be formed at other temperatures. It is, therefore, possible to prepare chloronitro compounds in accordance with the present invention and obtain relatively high yields by the interaction of nitryl chloride with olefins and diolefins if the reaction conditions are properly controlled.

It has further been discovered that the nature and type of diluent employed plays a material role in obtaining optimum yields of the chloronitro derivative and that negatively substituted organic solvents which are themselves inert in the reaction, favorably affect the yield of chloronitro compounds. Such solvents include chloroform, carbon tetrachloride, chlorinated and brominated hydrocarbons, dichloro difluoro methane, nitromethane, etc. On the other hand, paraffin type solvents are less satisfactory and result in decreased yields. An excess of olefinic reactant, acting as its own solvent is midway between the negatively substituted solvent and a paraffin in effect on yield.

The chloronitro compounds prepared according to the present invention result from the addition of nitryl chloride to aliphatic olefins and diolefins having three or more carbon atoms. Such olefins include propylene, butene-1, the butenes-2, isobutylene, the pentenes including pentene-1, pentene-2, isopropyl ethylene and trimethyl ethylene, the straight or branched chain hexenes, heptenes, octenes, nonenes and higher olefins, butadiene-1, 3, butadiene-1, 2, the hexadienes, etc., and in general those compounds having the structure

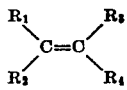

in which $R_1$, $R_2$, and $R_3$ may be hydrogen, alkyl, or alkenyl radicals, and $R_4$ may be an alkyl or an alkenyl radical. The chloronitro compound produced by the invention will correspond to the general formula

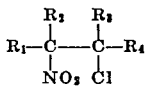

in which $R_1$, $R_2$, $R_3$ and $R_4$ are as defined above.

The chloronitro compounds of this invention are generally prepared by the slow addition of nitryl chloride ($NO_2Cl$) to the olefinic material contained in any suitable reaction vessel provided with a conventional stirring or agitating means and a method of temperature control. A device for carefully controlling the rate of introduction of the nitryl chloride is provided in order that an excess of the olefin be present at all times at the locus of the reaction thereby decreasing markedly if not preventing substantially all decomposition of the nitryl chloride before sufficient time is allowed for addition to the double bond. During the addition of the nitryl chloride the temperature is regulated in such a way that the formation of the chloronitro compound is the predominant reaction. Agitation is continued until the reaction is considered complete, after which the product is purified by distillation.

In view of the wide variation in properties of the olefinic materials which may be employed in the preparation of the compounds described in this disclosure, a wide range of operating temperatures will be found applicable. When olefins such as isobutylene are used, the optimum temperature range for the preparation of the 1-nitro-2-chloro compound is from about —30 to +30° C. However, it is to be understood that where other reaction systems are concerned, this temperature range will not necessarily apply.

Pressures which are applicable in the present process may range from atmospheric to about 2000 pounds per square inch gage or higher depending upon the olefin chosen and also upon whether vapor, liquid or mixed phase operation is preferred. While mixed phase operation is often employed, it is frequently found advantageous to use either the liquid or vapor phase to obtain a maximum yield of the product.

The reaction time required for the operation of the present process depends upon the olefinic material employed. When olefins such as isobutylene are used, the reaction occurs immediately upon the addition of the nitryl chloride. However, with less reactive olefins and other olefinic materials a somewhat longer period is necessary.

According to my process, the reaction between nitryl chloride and the olefinic material may be carried out either in the presence or absence of a diluent. In some cases a diluent is employed. Among the materials which are applicable may be mentioned paraffin hydrocarbons such as $C_3$ to $C_6$ or higher hydrocarbons, cycloparaffins such as cyclohexane, and halogenated compounds such as chloroform. Mixtures of saturated hydrocarbons such as low boiling cuts from natural gasoline fractions are also applicable. It is sometimes found advisable to use a large excess of the olefinic material as a diluent although the desirability of following such a procedure is dependent largely upon the availability of the olefin. Although the reaction can proceed in paraffinic solvents as well as in excess of olefinic material as diluents, it has been found, as discussed above, that increased yields are obtained when negatively substituted inert solvents of the type described are utilized.

The mol ratio of olefinic material to nitryl chloride employed is generally at least one to one with an excess of the olefinic material preferred. A ratio of about two mols olefinic material to one mol nitryl chloride is frequently considered satisfactory in order to obtain optimum yields of the chloronitro product. However, this ratio is governed by the olefin or other olefinic material in question and whether it is to be used as the diluent in the reaction.

The nitryl chloride employed in the synthesis of the chloronitro compounds of this invention may be prepared by any known method. The method generally preferred comprises the slow addition of chlorosulfonic acid to a mixture consisting of nitric acid and concentrated sulfuric acid containing sulfur trioxide. A temperature of about —2.2 to 1.7° C. is employed for carrying out the reaction. The nitryl chloride evolved is conducted to a suitable low temperature distilling column where the product is purified.

*Example I*

The synthesis of 1-nitro-2-chloroisobutane was accomplished by the interaction of nitryl chloride with isobutylene. The nitryl chloride was prepared from nitric acid and chlorosulfonic acid in the presence of sulfuric acid. A mixture of concentrated sulfuric acid containing 20 per cent $SO_3$ was charged to a flask which contained concentrated nitric acid. The temperature was held at about 0° C. during the addition of the nitric acid. The reaction was then warmed to about 30° C. and stirred vigorously during the addition of chlorosulfonic acid. The nitryl chloride distills as it is formed and is collected in the suitable receiver and cooled to about —30° C. or lower. The nitryl chloride was then fractionated and led directly to the reaction vessel.

Nitryl chloride (2.7 mols) was charged directly from the still into a reaction flask containing six mols isobutylene. The nitryl chloride was bubbled slowly into the isobutylene under reflux while the reaction mixture was stirred. Upon the completion of the addition of nitryl chloride the excess isobutylene was removed by distillation and the remaining material was then transferred to a still pot and evacuated to 5 to 10 mm. at room temperature to remove any low boiling fractions which were present. The 1-nitro-2-chloroisobutane, ($b$ 35–42° C./2 mm., $n_D^{24}$ 1.4530), was obtained in a 51 per cent yield.

*Example II*

Ninety grams (one mol) of 70 per cent nitric acid was charged to a 500 cc. flask and the temperature maintained at minus 17.8 to minus 6.7° C. during the addition of 120 grams of oleum (20 per cent $SO_3$). The temperature was allowed to increase to 0 to 1.7° C. and 116 grams (one mol) of chlorosulfonic acid was added dropwise while the reactants were stirred. Subsequent to the addition of the chlorosulfonic acid the nitryl chloride was distilled. A 0.95 mol yield of the product was obtained.

The synthesis of 1-nitro-2-chloroisobutane in the presence of a large amount of isobutylene, which acted as a diluent, was accomplished as follows: 430 grams (7.7 mols) of isobutylene was charged to a one-liter flask and nitryl chloride was introduced slowly while the mixture was stirred and refluxed.

Upon completion of the reaction the flask was evacuated to 2 mm. at room temperature in order to remove low boiling products. The nitryl chloride-isobutylene adduct distilled at 32–37° C./2 mm. and a 42 per cent yield of the product was obtained.

Example III

Gaseous nitryl chloride was charged at a slow rate into isobutylene vapor until the mol ratio of the reactants was approximately 1:9. The reaction temperature was held within the range minus 7.2 to minus 3.9° C. during the addition of the nitryl chloride. The product was cooled in a Dry Ice bath and then distilled as in Example I. A 42 per cent yield of 1-nitro-2-chloroisobutane was realized.

In the same manner 1-nitro-2-chlorobutane may be prepared by the addition of nitryl chloride to butene-1, while 2-nitro-3-chlorobutane may be prepared by the addition of nitryl chloride to butene-2. 1-nitro-2-chloropropane may also be formed by the addition of nitryl chloride to propylene and other chloronitro paraffins of the type described may be prepared from other olefins having at least three carbon atoms.

Example IV

Addition of nitryl chloride to isobutylene, pentane as solvent. Isobutylene (97 grams=1.73 mols) was dissolved in 200 ml. C. P. n-pentane and stirred during the addition of nitryl chloride (74 grams—0.85 mols). The temperature was about 10–15° C. during the addition. Distillation of the product in vacuo gave a 20% yield (23 grams) of 1-nitro-2-chloro-2-methyl propane, (1-nitro-2-chloro isobutane).

Example V

Addition of nitryl chloride to isobutylene, chloroform solvent. Isobutylene (210 grams—3.75 mols) was dissolved in 200 ml. chloroform and stirred during the addition of 180 grams—(2.20 mols) nitryl chloride. The temperature was 7–12° C. The yield of 1-nitro-2-chloro-2-methyl propane was 64 per cent.

Example VI

Butadiene-1,3 (54 grams or 1 mol) was dissolved in 400 ml. carbon tetrachloride and stirred during the addition of nitryl chloride (81.5 grams=1 mol). The reaction temperature was held at about 0° C. Removal of the solvent in vacuo gave a butadiene-nitryl chloride adduct comprising the -1,4 and -1,2 addition products as the principal components along with minor proportions of -1,2,3,4 addition products formed by the addition of two mol proportions of the nitryl chloride.

I claim:

1. A process for the production of an aliphatic chloronitro hydrocarbon compound, having a chlorine atom and a nitro group respectively positioned on adjacent carbon atoms, which comprises gradually adding nitryl chloride to an aliphatic olefin, having at least three carbon atoms to the molecule, at such a rate that an excess of olefin is always present and at a temperature in the range of minus 30° C. to 30° C.

2. The process of claim 1 wherein the aliphatic olefin is a diolefin.

3. A process according to claim 1 wherein the addition of nitryl chloride is effected in the presence of a halogenated hydrocarbon solvent.

4. A process according to claim 1 wherein the addition of nitryl chloride is effected in the presence of pentane.

5. An aliphatic chloro-nitro hydrocarbon compound having a chlorine atom and a nitro group respectively positioned on adjacent carbon atoms, said compound being an adduct of nitryl chloride and an aliphatic olefin, having at least three carbon atoms to the molecule, and having been formed by gradually adding nitryl chloride to said aliphatic olefin at such a rate that an excess of olefin is always present and at a temperature in the range of minus 30° C. to 30° C.

6. An adduct according to claim 5 wherein the olefin is an aliphatic diolefin.

7. An adduct according to claim 5 wherein the olefin is butadiene-1,3.

8. A process for the preparation of a butadiene nitryl chloride adduct comprising as its principal components -1,4 and -1,2 addition products and minor proportions of -1,2,3,4 addition products which comprises the addition of nitryl chloride to butadiene-1,3 dissolved in carbon tetrachloride and maintained at about 0° C.

9. A process for the production of 1-nitro-2-chloro isobutane which comprises adding gaseous nitryl chloride into isobutylene maintained at a temperature in the range of minus 7.2° to minus 3.9° C.

10. A process for the production of 1-nitro-2-chloro isobutane which comprises adding nitryl chloride into isobutylene under reflux.

11. A process for the production of 1-nitro-2-chloro isobutane which comprises adding nitryl chloride to isobutylene at a temperature in the approximate range 10° to 15° C. and in the presence of a hydrocarbon solvent.

12. A process according to claim 11 wherein pentane is the solvent.

13. A process for the production of 1-nitro-2-chloro isobutane which comprises adding nitryl chloride to isobutylene at a temperature in the range 7° to 12° C and in the presence of a halogenated hydrocarbon solvent.

14. A process according to claim 13 wherein the solvent is chloroform.

CHESTER M. HIMEL.

REFERENCES CITED

The following references are of record in the file of this patent:

UNITED STATES PATENTS

| Number | Name | Date |
|---|---|---|
| 1,923,630 | Looker et al. | Aug. 22, 1933 |
| 2,302,721 | Schmerling | Nov. 24, 1942 |
| 2,337,912 | McBee et al. | Dec. 28, 1943 |
| 2,414,594 | Gold | Jan. 21, 1947 |
| 2,435,570 | Beckham | Feb. 10, 1948 |

FOREIGN PATENTS

| Number | Country | Date |
|---|---|---|
| 739,533 | Germany | Sept. 28, 1943 |

OTHER REFERENCES

Henry "Chem. Cent.," 1898, vol. I, page 193.

Steinkopf et al., "Ber. Deut. Chem.," vol. 75, (1942), pages 1323–1329.